No. 843,109. PATENTED FEB. 5, 1907.
B. C. SABIN.
PIE PAN.
APPLICATION FILED FEB. 15, 1906.

Witnesses
T. P. Britt
E. C. Duffy

Inventor
Belle C. Sabin,
by O. E. Duffy
Attorneys

UNITED STATES PATENT OFFICE.

BELLE C. SABIN, OF CHICAGO, ILLINOIS.

PIE-PAN.

No. 843,109.　　　Specification of Letters Patent.　　　Patented Feb. 5, 1907.

Application filed February 15, 1906. Serial No. 301,198.

*To all whom it may concern:*

Be it known that I, BELLE C. SABIN, a citizen of the United States, residing at Chicago, in the county of Cook and State of Illinois, have invented certain new and useful Improvements in Pie-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to cooking utensils, but more particularly to pie-pans, and has for its object to provide a device of this class whereby the upper and lower edge crusts on a pie are held firmly and securely together during the baking of the pie.

With this object in view my invention consists in the novel construction of the pie-pan and in the construction of the auxiliary rim, as will be first fully described and afterward specifically pointed out in the appended claims.

As is well known to cooks generally, it is practically impossible to hold the upper and lower edge crusts together by the usual method of pressing them together before placing the pie in the oven. The steam generated between the crusts during the baking of the pie invariably forces the edge crusts apart, even though the top crust has been perforated before placing the pie in the oven. The effects of this separation of the two crusts are that considerable of the essence of the pie is thus lost, while in many instances the inside material oozes out between the crusts into the oven, where it burns and produces considerable smoke and an unpleasant odor. The making of pies is on these accounts attended with considerable trouble and inconvenience. As will be seen, however, from the following specification, I have obviated these disadvantages, reference being had to the accompanying drawings.

Figure 1:
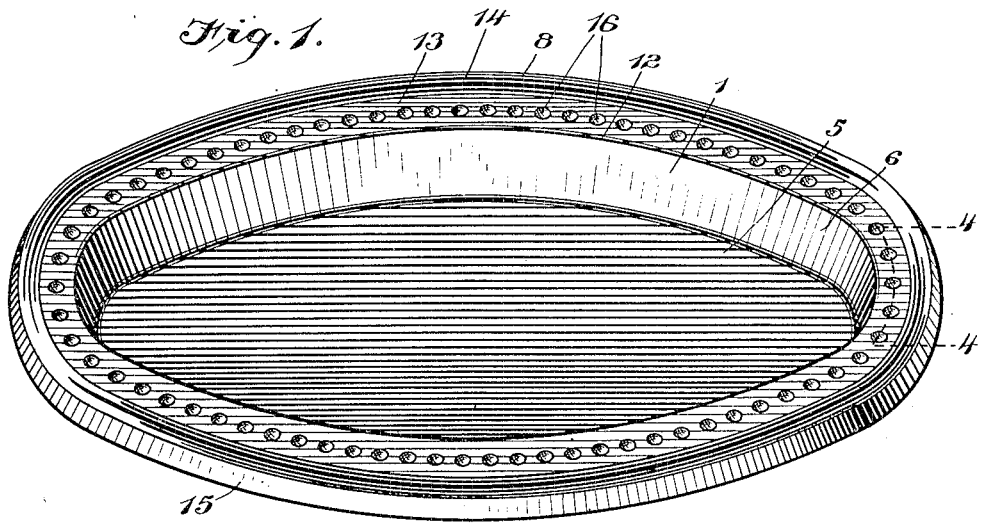
Figure 2:
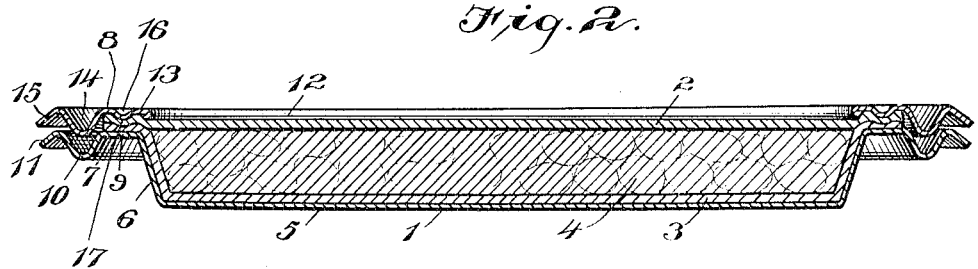
Figure 3:
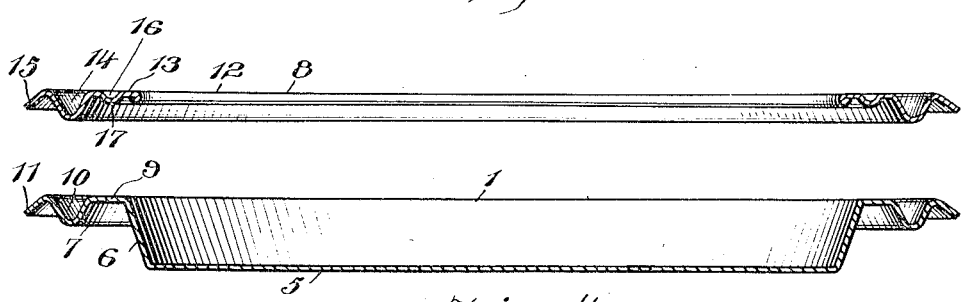

Figure 1 is a perspective view of the pie-pan. Fig. 2 is a vertical cross-section through the same. Fig. 3 is a vertical cross-section showing auxiliary rim removed, and Fig. 4 is a fragmentary vertical sectional view taken on line 4 4 of Fig. 1.

Like numerals of reference indicate the same parts throughout the several figures, in which—

1 indicates the pie-pan, which, as shown in Fig. 2, is supporting a piec omprising the upper and lower crusts 2 and 3, 4 being the inside material. The body 5 of the pan is of the usual shape, the side wall 6 being slightly flared in order to allow ready removal of the pie. It is in the outside rim 7 and auxiliary rim 8 that my invention consists.

Figure 4:
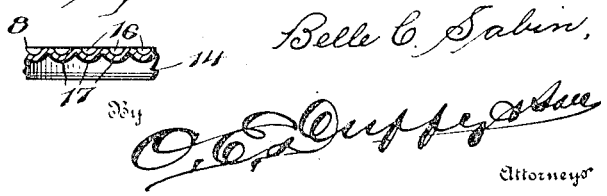

Referring to Fig. 4, it will be seen that a horizontal flange 9 is formed at the top of the side wall 6 and that an annular groove or trough 10 surrounds said flange 9, while the extreme outer edge 11 of the rim is preferably sloped downwardly.

Referring now to the auxiliary rim 8, it will be seen that a bead 12 is formed on the inside edge thereof, while a horizontal flange 13, substantially the width of the flange 9 on the pan-rim, is formed, as are also an annular groove or trough 14 and sloping outer edge 15, conforming to the pan-rim. As shown in Figs. 1 and 4, however, the face of the flange 13 on the auxiliary rim is provided with a series of indentations 16, which form projections 17 on the bottom face of said flange.

Having thus described the several parts of my invention, its operation is as follows: The pie is made in the usual manner, the bottom and top crusts being placed as is usual. When the said crusts are in position, the same is cut by passing a knife in the groove or trough 10 and cutting the crusts against the outer edge of the flange 9. The auxiliary rim 8 is then placed in position, as shown in Fig. 2, and pressure is applied to same, which forces the bead 12 on the auxiliary rim into the top cover and also forces the projections 17 into the top cover, which effectually unites the top and bottom covers. The pie is then baked in the usual manner.

In order to absolutely guard against the inside material of the pie running into the oven, the groove or trough 10 is provided, which will receive and effectually prevent any dripping from the pie-pan.

Having thus fully described my invention, I do not wish to be understood as limiting myself to any particular shape of pan, as my invention can be applied equally well to square or oblong pans.

What I claim as my invention, and desire to secure by Letters Patent of the United States, is—

1. In a pie-pan or the like, the combination of a pan having a flange formed on its outer rim, a groove or trough on the outside of said flange, and an auxiliary rim having a bead on its inner edge, a flange provided with extensions and a groove or trough corresponding with said groove or trough on the pan.

2. In a pie-pan or the like, the combination of a pan having a flange formed on its outer rim, a groove or trough outside of said flange, and an auxiliary rim comprising a flange, and a groove or trough corresponding with said groove or trough on said rim of the pan and arranged to force the pie-crust into said groove or trough on the rim of the pan, substantially as described.

In testimony whereof I affix my signature in presence of two witnesses.

BELLE C. SABIN.

Witnesses:
   Mrs. S. T. JENNINGS,
   BLANCHE SABIN.